(12) United States Patent
Turkman

(10) Patent No.: US 7,614,092 B1
(45) Date of Patent: Nov. 10, 2009

(54) POWER VENTED ODORLESS NON-OVERFLOW AUTO FLUSH TOILET

(76) Inventor: Samsam U. Turkman, 1265 Hamlock La., Unit G, Elgin, IL (US) 60120

(*) Notice: Subject to any disclaimer, the term of this patent is extended or adjusted under 35 U.S.C. 154(b) by 117 days.

(21) Appl. No.: 11/403,706

(22) Filed: Apr. 12, 2006

Related U.S. Application Data

(63) Continuation-in-part of application No. 10/419,756, filed on Apr. 22, 2003, now abandoned.

(51) Int. Cl.
*E03D 9/04* (2006.01)
(52) U.S. Cl. .......................................... 4/216
(58) Field of Classification Search .............. 4/213, 4/216, 347, 352, 427
See application file for complete search history.

(56) References Cited

U.S. PATENT DOCUMENTS

| | | | | |
|---|---|---|---|---|
| 1,228,786 A * | 6/1917 | Klemme | ...................... | 4/216 |
| 1,276,965 A * | 8/1918 | Rowe | ........................... | 4/214 |
| 1,955,579 A * | 4/1934 | De Malaussene | ............. | 4/213 |
| 1,972,774 A * | 9/1934 | Hartwell | ...................... | 4/213 |
| 6,944,892 B1 * | 9/2005 | Giolas | ......................... | 4/427 |

* cited by examiner

*Primary Examiner*—Huyen Le
(74) *Attorney, Agent, or Firm*—Dillis V. Allen, Esq.

(57) ABSTRACT

A toilet assembly with a turbine bladed fan powered vent that is timed by user position and a shut-off delay. The vent discharges to a vertical gutter vent stack behind an adjacent wall. An automatic overflow control system is provided, if a clog occurs, including a bowl mounted plastic grill, that also discharges into the same vent stack is connected at its lower end to the main sewer drain. A flush assembly in the water tank is controlled by a relay activated by a pressure switch as soon as the user gets up from the toilet seat.

10 Claims, 2 Drawing Sheets

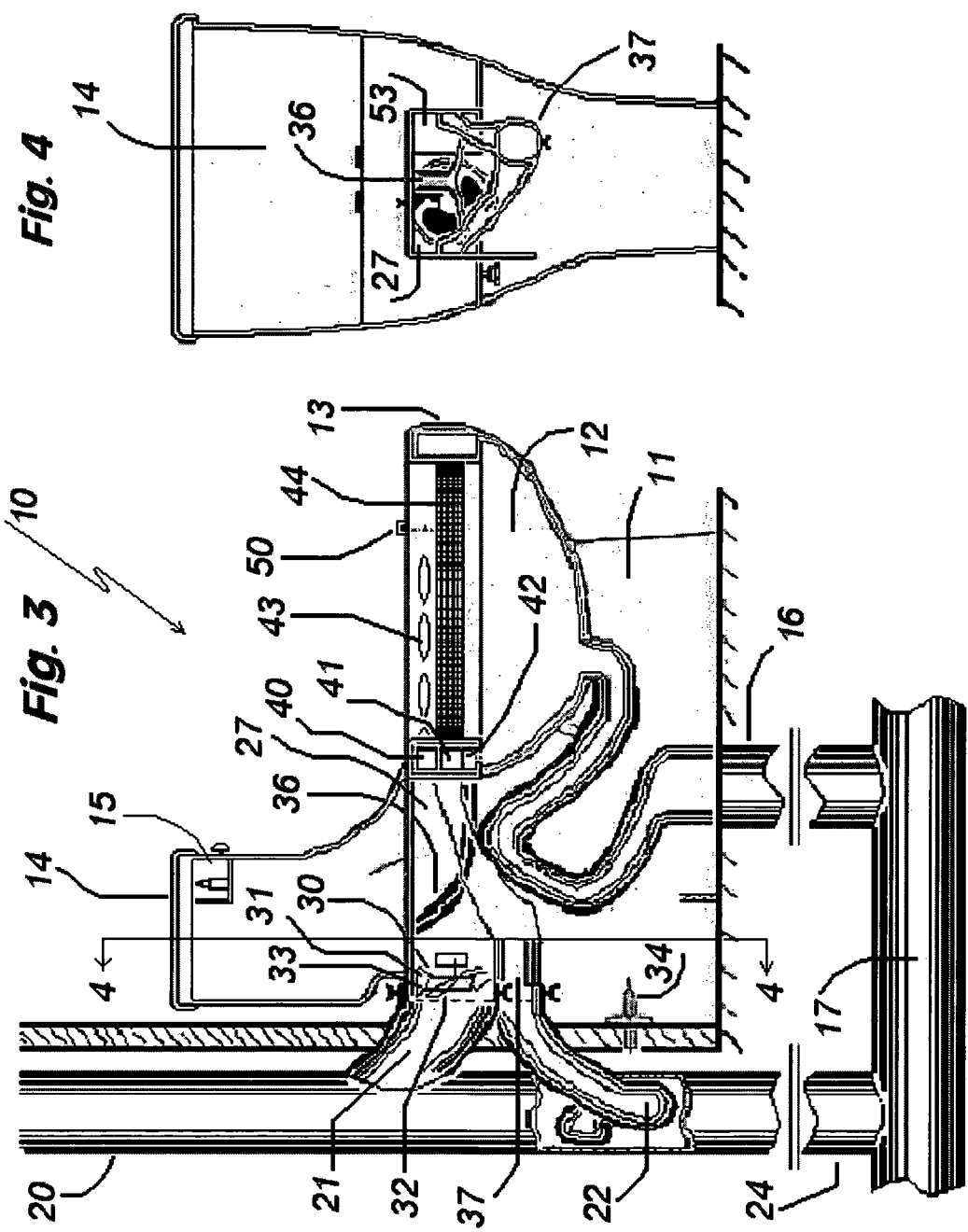

POWER VENTED ODORLESS NON-OVERFLOW AUTO FLUSH TOILET

RELATED APPLICATION

This application is a CIP (continuation-in-part) of U.S. Ser. No. 10/419,756, entitled "STINK-FREE NON-OVERFLOW AUTOMATIC TOILET", filed Apr. 22, 2003, now abandoned now pending.

BACKGROUND OF THE INVENTION

Vented water closets or toilets have been patented for many decades to remove unpleasant odors from the toilet bowl area, but none of them have worked; therefore, no odorless toilet bowls are found anywhere. No inventor has previously claimed to have an odorless toilet bowl.

For example, the Bruder, U.S. Pat. No. 1,061,522 issued May 13, 1913, shows a horizontal vent passage 13 for venting the bowl area. Bruder fails to disclose any suction device for making his system operable.

The Sim, U.S. Pat. No. 5,005,222, issued Apr. 9, 1991, shows a fan 49 in FIG. 2 designed to draw gases through passage 47. The tortuous air flow hindering the Sim's passage 47, 48, the narrowness of the passage failing to blow through enough volume of air, and the fact that it blows air down into the sewer through drain 53 makes this system unworkable, since a higher volume of fast blowing air is technically required. The higher capacity or stronger air blower motor fan that are required to do this job cannot fit in small air passage 48, FIG. 2, to increase volume of air because limitations of electrical engineering science that they cannot be built so small. Even if the passage 48 was to be enlarged to make room for a larger size fan, it would be useless because of narrowness of passage into sewer drain 53 that is sharing half of its space with the bowl's drain in the bottom. Reduction in a bowl's universally recognized drain size would naturally clog this toilet with stool and it would not be doing its original basic job as a toilet bowl.

Mr. Sim's second U.S. Pat. No. 5,054,131 issued Oct. 8, 1991, has an air passage in the water tank double that of his first patent in length, increasing work load for the already insufficiently small blower fan. The rest of the already explained problems of his first patent remained unsolved in this patent.

Mr. Sim's third U.S. Pat. No. 5,079,782 issued Jan. 14, 1992, replaces the airflow reducing L and U shape curves of his first two patents with two S and one V shape curves in the air passage but the rest of the problems remain unsolved. Floating stool has no hindrance in entering air passage 21, FIG. 2 with water if this toilet gets clogged, making at least the little fan stop, if it does not cause an electrical hazard also.

Mr. Sim's fourth U.S. Pat. No. 5,167,039 issued Dec. 1, 1992, added back airflow reducing U and L shape curves of first two patents and eliminate the third patent's two S shape curves. The stool clogging problem in the bottom of sewer drain of all earlier patents is solved by giving the bowl universally recognized full exit to drain however, a new problem has been created by reducing the already insufficient air passage to half of size of previous patents as passage 33, FIG. 2 reaches the rim level to blow air in to space 19. This causes another new problem of air pressure build up in 19 causing air to bubble back up through water in the bowl.

Mr. Sim's fifth U.S. Pat. No. 5,353,443, issued Oct. 11, 1994, reduced the size of space 19 of the fourth patent as seen in new 19 of FIG. 2, but the passage of air into 19 remains like in the fourth patent and to make blower fan's job even harder, he added more curves in the air passage from 49 to 50.

None of Mr. Sim's inventions could pull objectionable air out of toilet bowl faster than they could reach a human nose because much more volume of air is needed to be pulled in by the blower fan very fast. Even if larger blower fans were used and there were no airflow hindering torturous curves in the passage, the blown air would rush back into the bowl, when flushing it would cause extreme sudden pressure in the drain, like a mini tornado. This is why no manufacturer wanted to waste time and money on any of Mr. Sim's patents and none of them made it to the marketplace.

The Fernald, U.S. Pat. No. 5,029,346, issued Jul. 9, 1991, shows a venting system that is positioned at 72 in FIG. 2 within the tank 20. The passage of air is very narrow to blow odors out of the bowl since a lot more volume of air through a lot less curvy passage is needed to make a toilet bowl completely stink-free. Fernald has a discharge at 52 that appears to discharge waste gases and odors inside the wall studs which would render it unacceptable from a safety standpoint.

The Martens, U.S. Pat. No. 6,158,058, issued Dec. 12, 2000, shows a separate tube for venting the bowl area but is not integral with the bowl nor is there any positive suction system associated with the Martens device. It's a recreational vehicle and boat toilet bowl as inventor has claimed. It is not a toilet bowl for general or domestic use. The idea in this patent has also flopped because it did not work.

It is a primary object of the present invention to ameliorate the problems noted above in vented toilets, as well as in toilet overflow systems. No toilet bowls have been found that would not spill water off the top of the rim if the toilet was clogged and flushing or over-flushing rendered the bowl too small to hold the non-draining water. Only Mr. Bruder's U.S. Pat. No. 1,060,522 issued May 13, 1913, claims to have such an assembly but it is impractical and no manufacturer has bought his idea for 93 years.

No domestic use toilets have been found in the market that flush automatically as a person gets up from the toilet seat and Mr. Sim's patents have not been accepted by any manufacturers because they did not work.

Though many have claimed to build ventilating toilet bowls to eliminate objectionable air, nobody on record has claimed to have invented a completely odorless toilet.

SUMMARY OF THE PRESENT INVENTION

In accordance with the present invention, a toilet assembly is provided with a turbine bladed fan powered vent that is timed by user position and a shut-off delay. The vent discharges to a vertical gutter vent stack behind an adjacent wall. An overflow system in case of clogging including a bowl mounted plastic grill, that also discharges into the same gutter vent stack, is connected at its lower end to the main sewer drain, and has an automatic flushing system for a domestic use toilet bowl. No patents for any kind of toilet bowls have been found that have three functions of odorless, overflow control if clogged, and automatic flushing, all in one.

In distinction to other systems, such as the Sim systems described in the Background of the Present Invention, the present vent system discharges into a vertical vent stack behind the adjacent wall, rather than into the sewer drain. Mr. Fernald's and some other people's systems do not discharge into a gutter vent stack as this system.

An important aspect of the present invention is that the vent discharge passage is integral with the toilet bowl and has a diameter of at least four inches to properly remove the foul gases gutter stack rising from. A further important aspect of the present invention is that the fan has turbine-type blades, as opposed to propeller-shaped small blades, and a high power 3000 r.p.m. motor that is able to blow 70 cubic feet air per minute, 100 feet away in at least a 4 inch duct to improve air flow capacity.

A further important aspect of the present invention is that the overflow system includes a plastic grill inside the toilet rim that blocks large stool particles from entering the water passage conduits of the toilet bowl. The overflow system includes an integral passage in the bowl that is connected by a wall impaling conduit to the same vertical vent pipe or stack that the gas vent system discharges into.

Other objects and advantages of the present invention will appear more clearly from the following detailed description.

BRIEF DESCRIPTION OF THE DRAWINGS

FIG. 3 is a left side view of the toilet assembly illustrated in FIG. 1, partly in section, and;

FIG. 4 is a vertical section taken generally along line 4-4 of FIG. 3.

DETAILED DESCRIPTION OF THE PREFERRED EMBODIMENT

Figure 1:
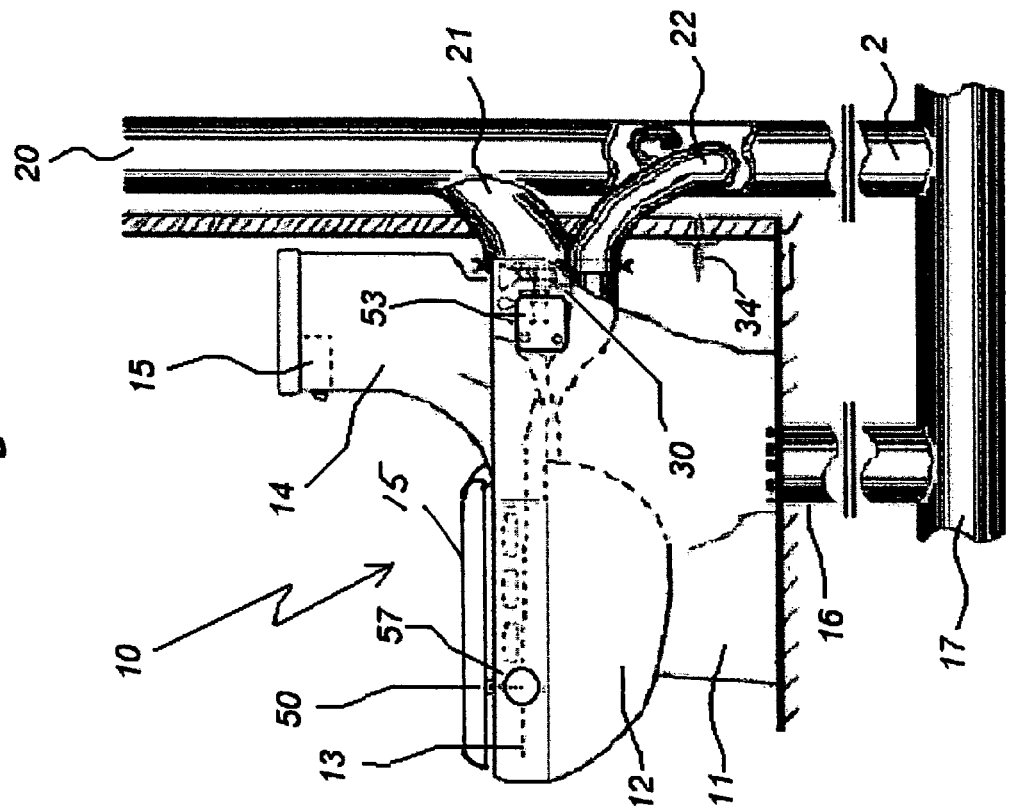
FIG. 1 is a right side plan view of the present toilet assembly illustrating the typical installation to an adjacent vertical vent pipe.

Referring to the drawings and particularly to all four figures, a toilet assembly 10 is illustrated consisting generally of a base portion 11, a bowl portion 12, a rim portion 13, a seat portion 15, and a tank assembly 14, connected by pipe 16 to discharge effluent into a sewer drain 17. The bowl portion 12 is vented into a vertical stack 20 through a curved duct 21 and an overflow system discharges through rubber hose 22 into the vent stack 20, which at its lower end 24 discharges into the sewer drain 17.

As seen more clearly in FIGS. 3 and 4, a vent passage 27 integral with the ceramic integral base 11 has a width of more than six inches and extends generally horizontally into the bowl interior through passage 28, as seen in FIG. 4. It has air intake holes 43, FIG. 3, above the water intake holes 43, FIG. 3, so that water cannot reach them in case the toilet gets clogged.

A fan-motor assembly 30 is mounted at the rear of the passage 27 and includes a rotary fan 31 having turbine-type fan blades 32 diameter 5½ inches as opposed to propeller-type small blades making it much more efficient by blowing 70 cubic feet of air per minute up to 100 feet away. Blades 32 have flat radial outer tangential surfaces 33 as opposed to scalloped-type propeller type blades. Water inlet 34 is illustrated in FIGS. 1 and 3 but is not connected.

The tank 14 contains the flushing mechanism which is conventional and hence not illustrated in detail in the drawings. A Sloan[R1] valve could be used in place of a conventional flushing assembly. A cavity 15 to hold solenoid switch is in the tank 14 to accomplish auto flush activated by relay 55, FIG. 2.

Integral tube 36 conveys water from tank 14 into the bowl interior 12.

Also formed integrally with the base 11 is an overflow passage 37 in case the toilet gets clogged, which extends generally horizontally and rearwardly from the bowl interior 12 and discharges through a rubber hose 22 into the gutter vent stack 20 from where it drains into the sewer drain 17.

[1.] Sloan[R] is a registered trademark.

The rim 13 has a plurality of annular passages 40, 41, and 42 therethrough. Passage 42 connects to tank's water flushing built-in pipe 36 to provide the filling water from tank 14 into bowl interior 12. Passage 41 connects to overflow pipe 37 and communicates with a plurality of passages covered by a plastic grill 44 having a multitude of rectangular orifices therein as shown to provide an overflow system for the toilet assembly 10 through the grill, passage 41, overflow passage 37, hose 22, and the lower part of the gutter vent stack 20 to the sewer drain 17.

Figure 2:
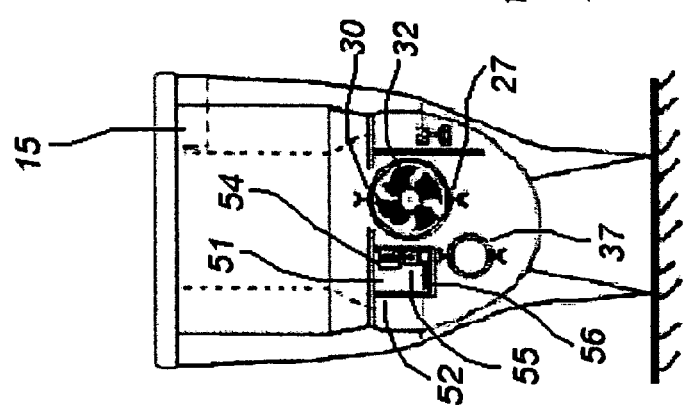
FIG. 2 is a rear view of the toilet assembly illustrated in FIG. 1.

Passage 40 turns into a wide passage 27, FIG. 3, which is located on the top of overflow water drain passage 37, leading the smelly air from the bowl 12 coming from oval shape intake holes 43 on the top of overflow water intake 44, converts into a tabular form before reaching fan-motor assembly 30, FIGS. 2 and 3, and remains tubular in the rear as seen in 27 of FIG. 2 with fan blades 32 as seen in FIG. 2.

The tubular ending of 27 is connected to duct 21, FIGS. 1 and 3, to let air be directly blown into the gutter vent stack 20 with least curvy hindrance following the tunnel air flow aerodynamics laws.

The gas venting exhaust system is controlled by switch 50, FIG. 1, fully insulated with a rubber cap against water excess, and the controls 51, FIG. 2, in the integral base compartment 52, FIG. 2. The base compartment 52 and switch 50 have removable access covers 53 and 57 respectively shown in FIG. 1. The controls 51 include a trans-former 54 that converts 120 AC power to 24V DC sending 24 volts charge to the insulated switch 50 to operate the controls. A relay 55 in the controls is actuated by switch 50 as it is depressed by an unshown toilet seat as the user positions his or her buttocks on the seat. Switch 50 actuates relay 55 to start the fan motor assembly 30. A timing circuit 56, also controlled by relay 55, maintains power to the fan motor assembly 30 for 10 to 15 minutes after switch 50 is released as the user exits the toilet assembly that flushes the toilet immediately after the user gets up from the toilet seat. If another person starts using it before the cycle is over, the relay restarts a new cycle without causing any shorts or electrical hazard.

The invention claimed is:

1. A toilet assembly, comprising: a water supply tank, a bowl connected to receive water from the tank including a bowl portion and a rim portion, a seat on the bowl portion, said bowl portion including a siphon conduit, a vent pipe extending generally vertically upwardly adjacent the bowl portion, a large integral vent passageway adjacent the bowl portion extending generally horizontally from an upper portion of the bowl portion, conduit means connecting the vent passageway to the vent pipe, a fan-motor assembly mounted in the vent passageway for drawing foul smelling air and gas from the bowl portion and expelling it into the vent pipe, an overflow passage provided in a lower portion of the vent passage and above a tank water supply passage, said vent pipe extending a substantial distance upwardly above the toilet assembly so that the foul smelling air and gas from the bowl portion is expelled upwardly from the toilet assembly, and user activated controls for activating the fan-motor assembly when the toilet assembly is in use, said user activated controls being responsive to the user engaging the seat to activate the fan-motor assembly during the time the toilet assembly is in use prior to flushing.

2. A toilet assembly as defined in claim 1, including a switch positioned to be activated by the toilet assembly user for activating the fan-motor, and an automatic flushing assembly through the controls.

3. A toilet assembly as defined in claim 1, including a timer in the controls for deactivating the fan-motor assembly a predetermined time interval after the user leaves the toilet assembly.

4. A toilet assembly as defined in claim 1, wherein the vent passageway is connected at its upper end to the vent pipe rising from a sewer drain, said overflow passage being connected to integral overflow conduits connected to the vent pipe so that overflow water discharges into the vent pipe and downwardly to the sewer drain.

5. A toilet assembly as defined in claim 1, wherein no portion of the vent passageway is less than 4.0 inches in diameter.

6. A toilet assembly as defined in claim 1, wherein an electrical and electronics accessories unit is mounted in an integral opening in a bowl base covered by an access plate, said controls including a low voltage D.C. transformer, a relay and a timer for the delayed shut off of the fan-motor assembly.

7. A toilet assembly, comprising: a water holding tank, a bowl connected to receive water from the tank including a base portion, a bowl portion and a rim portion, said base portion including a siphon conduit connected to a sewer drain, a vent duct extending generally vertically upwardly adjacent the bowl portion, a large integral vent passageway right under the rim of the bowl portion extending generally horizontally, the vent passageway is connected at its upper end to the vent duct, said bowl portion including an overflow passage under air vent conduits and above tank water supply conduits, said overflow passage being connected to an integral overflow pipe connected to the vent duct so that overflow water discharges into the vent duct and downwardly to the sewer drain.

8. A toilet assembly as defined in claim 7, wherein the vent passageway extends generally horizontally from an upper portion of the bowl portion to the back of the toilet bowl under the tank, conduit means connecting the vent passageway to the vent duct, a fan motor assembly mounted in the vent passageway in the back under the tank for drawing gas and odors from the bowl portion and blows it into the duct, and controls for activating the fan motor assembly when the toilet assembly is in use.

9. A toilet assembly as defined in claim 8, including a switch positioned to be activated by the toilet assembly user for activating the fan-motor assembly through the controls.

10. A toilet assembly as defined in claim 8, including a timer in the controls for deactivating the fan motor assembly a predetermined time interval after the user leaves the toilet assembly and flushing the tank immediately.

\* \* \* \* \*